US008913501B2

(12) United States Patent
Branch et al.

(10) Patent No.: US 8,913,501 B2
(45) Date of Patent: Dec. 16, 2014

(54) EFFICIENT URGENCY-AWARE RATE CONTROL SCHEME FOR MULTIPLE BOUNDED FLOWS

(75) Inventors: Joel W. Branch, Hamden, CT (US); Han Chen, White Plains, NY (US); Hui Lei, Scarsdale, NY (US); Konstantin Shagin, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 187 days.

(21) Appl. No.: 13/587,466

(22) Filed: Aug. 16, 2012

(65) Prior Publication Data

US 2014/0050094 A1 Feb. 20, 2014

(51) Int. Cl.
*H04L 12/24* (2006.01)
*H04L 12/801* (2013.01)

(52) U.S. Cl.
CPC ............. *H04L 41/5019* (2013.01); *H04L 47/10* (2013.01)
USPC ...................................................... 370/235.1

(58) Field of Classification Search
CPC ... H04L 47/10; H04L 47/215; H04L 47/2441; H04L 47/22; H04L 47/21; H04L 47/20; H04L 47/14; H04L 41/5019
USPC ........................................ 370/229, 235, 235.1
See application file for complete search history.

(56) References Cited

U.S. PATENT DOCUMENTS

| 6,147,970 | A  | * | 11/2000 | Troxel ............................ 370/235 |
| 6,636,480 | B1 | * | 10/2003 | Walia et al. .................... 370/229 |
| 6,862,265 | B1 |   | 3/2005  | Appala et al. |
| 6,901,050 | B1 |   | 5/2005  | Acharya |
| 7,126,913 | B1 | * | 10/2006 | Patel et al. .................. 370/230.1 |
| 7,289,514 | B2 | * | 10/2007 | Robotham et al. .......... 370/395.4 |
| 7,564,790 | B2 | * | 7/2009  | Burns et al. .................... 370/235 |
| 7,586,848 | B1 |   | 9/2009  | Gunduzhan |
| 7,633,862 | B2 |   | 12/2009 | Nishimura |
| 7,697,844 | B2 |   | 4/2010  | Guo et al. |

(Continued)

FOREIGN PATENT DOCUMENTS

WO    WO2007051374 A1    5/2007

OTHER PUBLICATIONS

IBM "Traffic Shaping Using Pause Frame with Token Backet Policer," IPCOM000155803D (Published Jul. 20, 2007).

(Continued)

*Primary Examiner* — Chi H Pham
*Assistant Examiner* — Robert Lopata
(74) *Attorney, Agent, or Firm* — Preston Young; Michael J. Chang, LLC

(57) ABSTRACT

A method for controlling a flow rate of multiple data flows at a network node on a path of the data flows includes the following steps. A private restriction token bucket (RTB) and a private guarantee token bucket (GTB) for each of the data flows and a shared token bucket (STB) common to all of the data flows are provided. n tokens are obtained from the RTBi for the data flow i when a message belonging to the data flow i arrives at the node and needs n tokens. An attempt is made to obtain n tokens from the GTBi for the data flow i and/or the STB. The message is transmitted if n tokens are obtained from the GTBi and/or from the STB, otherwise transmission of the message is delayed until n tokens are available in the GTBi and/or in the STB.

24 Claims, 7 Drawing Sheets

(56) References Cited

U.S. PATENT DOCUMENTS

| | | |
|---|---|---|
| 7,719,968 B2 | 5/2010 | Swenson et al. |
| 7,826,358 B2* | 11/2010 | Caram .................. 370/230 |
| 2003/0069970 A1* | 4/2003 | Kim et al. ................. 709/225 |
| 2007/0070895 A1* | 3/2007 | Narvaez .................. 370/230 |
| 2007/0156928 A1* | 7/2007 | Raghunandan ............. 709/251 |
| 2009/0323525 A1 | 12/2009 | Chen et al. |
| 2010/0195504 A1 | 8/2010 | Nandagopal et al. |
| 2010/0211644 A1 | 8/2010 | Lavoie et al. |
| 2010/0246596 A1 | 9/2010 | Nakamura et al. |
| 2010/0329118 A1 | 12/2010 | Adams |
| 2011/0007687 A1 | 1/2011 | Howe et al. |
| 2011/0019571 A1 | 1/2011 | Chen et al. |
| 2011/0235509 A1* | 9/2011 | Szymanski .................. 370/230 |

OTHER PUBLICATIONS

Liu et al., "Burst Reduction Properties of Rate-Control Throttles: Downstream Queue Behavior," IEEE/ACM Transactions on Networking, vol. 3, No. 1, Feb. 1995.

Sohraby et al.,"On the Performance of Bursty and Modulated Sources Subject to Leaky Bucket Rate-Based Access Control Schemes," IEEE Transactions on Communications, vol. 42, No. 2/3/4, Feb./Mar./Apr. 1994.

Aeron, A.; "Fine Tuning of Fuzzy Token Bucket Scheme for Congestion Control in High Speed Networks," 2010 Second International Conference on Computer Engineering and Applications (Apr. 2010).

* cited by examiner

FIG. 1

| TOKEN BUCKET | RATE |
|---|---|
| GUARANTEE | $G_i$ |
| RESTRICTION | $R_i$ |
| SHARED | $C-\Sigma G_i$* |

* THE SHARED TOKEN BUCKET REFILL RATE MAY BE GREATER THAN $C-\Sigma G_i$ SINCE THE EXTRA TOKENS THAT DO NOT FIT INTO THE GUARANTEE TOKEN BUCKET ARE PLACED THERE.

300

500

EFFICIENT URGENCY-AWARE RATE CONTROL SCHEME FOR MULTIPLE BOUNDED FLOWS

FIELD OF THE INVENTION

The present invention relates to data flow rate control techniques and more particularly, to data flow rate control techniques that satisfy guarantee and restriction requirements of multiple data flows at a network node.

BACKGROUND OF THE INVENTION

A flow is a sequence of messages that share characteristics, including quality-of-service (QoS) properties. Network flows have to be regulated in order to ensure that the data transmissions conform to defined bandwidth limits.

One approach used to regulate network flow is the token bucket technique which is a common algorithm used to control the amount of data that is injected into a network, allowing for bursts of data to be sent. In general, the token bucket concept is based on an analogy of a bucket that contains tokens. The tokens represent a certain denomination related to data transmission, such as data packet size. Thus, using this analogy, when a data packet of a certain size is to be transmitted, the bucket is inspected to see if there are enough tokens in the bucket to cover that size data packet. If so, the appropriate number of tokens is removed from the bucket (also referred to as "cashing in the tokens") and the data packet is transmitted. On the other hand, if an insufficient number of tokens is available, then transmittal of the data packet is canceled or held back until a sufficient number of tokens is available.

The token bucket concept is employed in several works. See, for example, U.S. Pat. No. 6,901,050 issued to Acharya, entitled "System and Methods for Flow-based Traffic Shaping," (which describes a system with multiple token buckets, each handling its flow), U.S. Pat. No. 7,719,968 issued to Swenson et al., entitled "Multi-Priority Multi-Color Markers for Traffic Metering," (which describes a system that contains token buckets with run time interdependencies), U.S. Pat. No. 7,586,848 issued to Gunduzhan, entitled "Elastic Traffic Marking for Multi-Priority Packet Streams in a Communications Network." (which is a scheme based on token buckets that incorporates bandwidth loans), U.S. Pat. No. 6,862,265 issued to Appala et al., entitled "Weighted Fair Queuing Approximation in a Network Switch Using Weighted Round Robin and Token Bucket Filter," (which combines weighted round robin scheduler with token bucket filters), and U.S. Pat. No. 6,147,970 issued to Troxel, entitled "Quality of Service Management for Aggregated Flows in a Network System," (which incorporates two levels of token buckets with the goal of maximizing throughput).

These approaches however deal only with restricting data flows and do not take into consideration the content of the data. For instance, the situation may arise where an urgent message needs to be transmitted, but the respective token bucket is empty. With these conventional approaches there is a risk that the urgent message might not be transmitted.

Thus, improved techniques for regulating network data flows would be desirable.

SUMMARY OF THE INVENTION

The present invention provides data flow rate control techniques that satisfy guarantee and restriction requirements of multiple data flows. In one aspect of the invention, a method for controlling a flow rate of multiple data flows at a network node on a path of the data flows is provided. The method includes the following steps. A private restriction token bucket for each of the data flows, a private guarantee token bucket for each of the data flows and a shared token bucket common to all of the data flows are provided, wherein the restriction token bucket for a given one of the data flows, data flow i, has a refill rate $R_i$ which is equal to a maximum flow rate for the data flow i and the guarantee token bucket for the data flow i has a refill rate $G_i$ which is equal to a minimum flow rate for the data flow i. n number of tokens is obtained from the restriction token bucket for the data flow i when a message belonging to the data flow i arrives at the node and needs the n number of tokens to pass through the node. An attempt is made to obtain the n number of tokens from one or more of the guarantee token bucket for the data flow i and the shared token bucket (e.g., if the guarantee token bucket for the data flow i is empty or contains less than the n number of tokens). The message is transmitted if the n number of tokens is obtained from one or more of the guarantee token bucket for the data flow i and from the shared token bucket, otherwise transmission of the message is delayed until the n number of tokens is available in one or more of the guarantee token bucket for the data flow i and in the shared token bucket. A destination of the data flows can be a web-based service having a service capacity C equivalent to a maximal rate of incoming requests, and the shared token bucket can have a refill rate equal to $C-\Sigma G_i$ plus tokens, if any, spilled from the guarantee token bucket for the data flow i.

Tokens can be reassigned from the guarantee token bucket of one of the data flows to the guarantee token bucket of another of the data flows. Further, when the message is urgent and at least one of the restriction token bucket for the data flow i, the guarantee token bucket for the data flow i and the shared token bucket is empty, overdrafting of tokens from the restriction token bucket for the data flow i, the guarantee token bucket for the data flow i and the shared token bucket can be permitted.

A more complete understanding of the present invention, as well as further features and advantages of the present invention, will be obtained by reference to the following detailed description and drawings.

BRIEF DESCRIPTION OF THE DRAWINGS

FIG. 1 is a diagram illustrating token bucket refill rates according to an embodiment of the present invention;

DETAILED DESCRIPTION OF PREFERRED EMBODIMENTS

Figure 2:
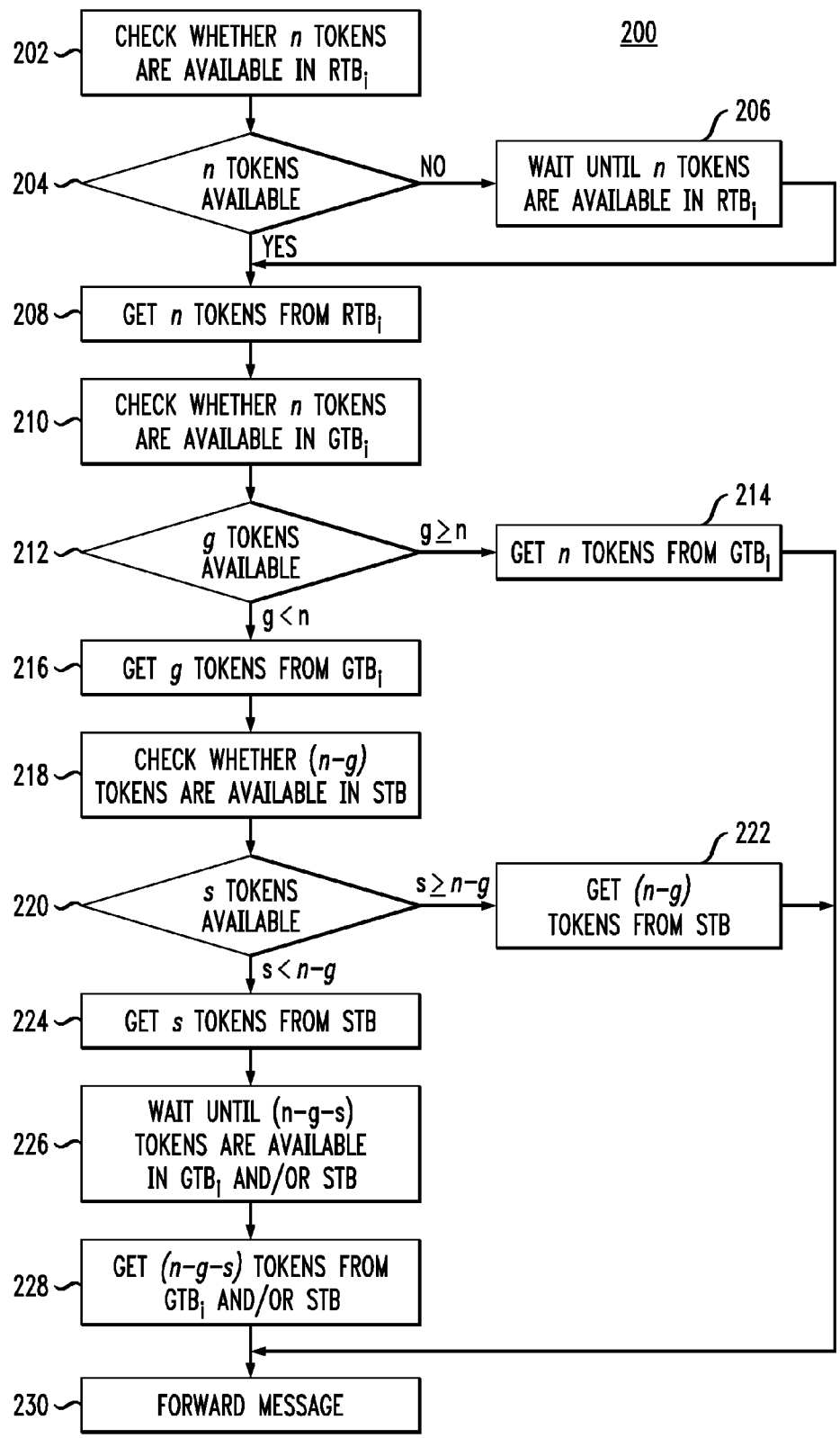
FIG. 2 is a diagram illustrating an exemplary methodology for controlling a flow rate of multiple data flows according to an embodiment of the present invention.

Provided herein are rate control techniques for satisfying guarantee and restriction requirements of multiple data flows at a network node. A guarantee requirement ensures that the output rate of a flow does not fall below a certain value (if the flow input rate permits). A restriction requirement ensures that the output rate of a flow does not exceed a certain limit. The present rate control scheme takes into account message urgency and, when allowed, may give priority to urgent messages despite rate control requirements.

A node on the path of several flows may be used to control the output rate of each flow. For example, in the context of access to a web-based service, a throttling node may be placed between the service clients and the service. The throttling node classifies the messages into flows and satisfies the flow guarantee and restriction requirements. This prevents clients from overwhelming the service while guaranteeing varying service levels for disjoint groups of clients.

Flow and service parameters: A service is assumed to have a maximal rate of incoming requests, which is referred to herein as service capacity (C). For each flow (e.g., between the service clients and the service), one can define upper and lower bounds of the rate, i.e., the desired maximum and minimum rate, respectively. The upper bound ($R_i$) is the restriction, while the lower bound ($G_i$) is the guarantee. A flow can have an upper bound, a lower bound, both upper and lower or no bounds at all. An undefined upper bound is equivalent to an infinite upper bound. An undefined lower bound is equivalent to it being of zero value.

Further, the sum of the lower bound $G_i$ (for all of the flows combined, i.e., $\Sigma G_i < C$) must not exceed the service capacity C (the idea here being not to guarantee more than the service can provide). For a given flow i, the lower bound $G_i$ is less than or equal to the upper bound $R_i$, i.e., $G_i \leq R_i$. The configuration of the throttling logic includes the service capacity (C), enumeration of flows and their specification of bounds ($G_i$ and $R_i$). These are the parameters that the throttling logic requires.

Token bucket configuration and dependencies: Each flow has two private token buckets, one for restriction and another for guarantee. There is also a shared token bucket. The refill rates of the token buckets are shown in FIG. 1. As shown in FIG. 1, the refill rate for the restriction token bucket is $R_i$ (i.e., the maximum flow rate for data flow i), the refill rate for the guarantee token bucket is $G_i$ (i.e., the minimum flow rate for data flow i) and the refill rate for the shared bucket is $C-\Sigma G_i$ since, as described above, the sum of the guarantee $G_i$ must not exceed the service capacity C. The service capacity is the rate at which the destination can handle incoming messages (requests). The shared bucket refill rate may be greater than $C-\Sigma G_i$ since the extra tokens that do not fit into the guarantee token bucket are placed in the shared token bucket (i.e., the refill rate of the shared token bucket is $C-\Sigma G_i$ plus whatever tokens are spilled from GTBi).

A depth limit of each token bucket with rate K equals $\alpha K$, where $\alpha$ is a configurable parameter (proportional to a desired burst size, i.e., the maximum possible rate). With conventional processes, during refill, the tokens that do not make it into the bucket due to the depth limit are discarded. The present techniques however deviate from this paradigm in order to maximize the throughput. When a private guarantee bucket is full, the extra tokens are inserted into the shared token bucket in addition to the shared token bucket refill rate (if the shared token bucket is not already full—i.e., the shared token bucket can overflow and these overflow tokens are discarded). Accordingly, as highlighted above, the shared token bucket refill rate may exceed $C-\Sigma G_i$ based on this token recovery process. This approach allows preserving tokens, which otherwise would be discarded (by allowing the flow to share the overflow tokens from the guarantee token bucket via the shared token bucket), without violating any requirements. The overall refill rate of all the guarantee buckets and the shared bucket does not exceed the service capacity C.

Message processing: Let m be a message belonging to flow i. The token buckets are denoted as $GTB_i$—guarantee token bucket of flow i, $RTB_i$—restriction token bucket of flow i and STB—shared token bucket. An exemplary methodology 200 for processing message m in the throttling node is shown in FIG. 2.

When message belonging to a particular flow (in this case message m belonging to flow i) arrives into the throttling node and the message requires a certain number of tokens to pass through, an attempt is made to obtain the tokens from the flow-private restriction token bucket of that flow (i.e., $RTB_i$ of flow i). In one non-limiting, exemplary embodiment, the number of tokens needed for a message to pass through the node is equal or proportional to a size of the message. In this case, for example, when a message of n bytes arrives into the throttling node, at least n tokens must be available in the restriction token bucket (RTB) in order for the message to be transmitted. Otherwise, the message is considered to be non-conformant. As will be described in detail below, non-conformant messages are either delayed or discarded. However, the number of tokens needed by a message is not necessarily equal or even proportional to its size. For example, a message sent by a silver customer may require more tokens than a similar message of a gold customer, etc. Thus, in the following it is assumed that the message requires n number of tokens to pass through the node. In step 202, the restriction token bucket is checked to see whether the restriction token bucket has n tokens (available). A determination is made in step 204 as to whether the restriction token bucket has n tokens available. If n tokens (e.g., n tokens for a message of n bytes) are not available in the restriction token bucket, then in step 206, the message is delayed until enough (i.e., at least n tokens) tokens are available in the restriction token bucket (i.e., $RTB_i$). In scenarios in which it is acceptable to discard messages, a message can at this stage be discarded instead of being delayed in step 206. If however the message is not to be discarded, according to an exemplary embodiment, once the required number (i.e., n number) of tokens is available, the process continues at step 208 (described below).

When n tokens are available in the restriction token bucket (i.e., $RTB_i$), in step 208, n tokens are removed from the restriction token bucket. Next, the system attempts to obtain n tokens from the flow-private guarantee token bucket (i.e., $GTB_i$ of flow i). Namely, in step 210, the guarantee token bucket is checked to see whether the guarantee token bucket has n tokens (available). The number of tokens available in the guarantee token bucket will be referred to hereinafter as g number of tokens. A determination is then made in step 212 as to whether the number of tokens in the guarantee bucket g is greater than or equal to the n number of tokens needed (i.e., $g \geq n$) or the number of tokens in the guarantee bucket g is less than the n number of tokens needed (i.e., $g < n$). If $g \geq n$, then in step 214, n tokens are taken from the guarantee token bucket, and in step 230 the message is forwarded.

On the other hand, if $g<n$, then in step 216, g tokens are taken from the guarantee token bucket. The system then tries to obtain the deficit (i.e., n−g tokens) from the shared token bucket. Namely, in step 218, the shared token bucket (STB) is checked to see whether the shared token bucket has n−g tokens available). The number of tokens available in the shared token bucket will be referred to hereinafter as s number of tokens. A determination is then made in step 220 as to whether the number of tokens in the shared bucket s is greater than or equal to the n−g number of tokens needed (i.e., $s \geq n-g$) or the number of tokens in the shared bucket s is less than the n−g number of tokens needed (i.e., $s<n-g$). If $s \geq n-g$, then in step 222, n−g tokens are taken from the shared token bucket, and in step 230 the message is forwarded. On the other hand, if $s<n-g$, then in step 224, s tokens are taken from the shared token bucket. In step 226, the message is delayed until the deficit number of tokens (i.e., n−g−s) is available in either the flow-private guarantee bucket (i.e., $GTB_i$ of flow i) or the shared token bucket (STB) or a combination of the guarantee and shared token buckets (i.e., the remaining tokens needed can come from either the guarantee token bucket, the shared token bucket, or both in order to obtain the correct number of remaining tokens). The refill rates for the token buckets are shown in FIG. 1, described above. Once the remaining number of tokens (n−g−s) is available in the guarantee token bucket and/or the shared token bucket, then in step 228, n−g−s tokens are taken from the guarantee token bucket and/or the shared token bucket, and in step 230 the message is forwarded. In scenarios in which it is acceptable to discard messages, a message can at this stage be discarded instead of being delayed at step 226.

One of the flow properties is whether messages belonging to the flow should be discarded or delayed in case the required number of tokens cannot be obtained from one of the token buckets. This property can be set by the administrator of the throttling node or be found inside message headers. It is also possible that the properties of an individual message (e.g., source, header contents, etc.) dictate the discard behavior.

Methodology 200 ensures the following. First, a flow never violates its restriction. Second, the flow is always able to send messages at least at the rate of the guarantee. Moreover, the flow may send messages at a rate higher than guaranteed, if the capacity of the service is not exhausted by other flows. This is implemented via the shared token bucket (STB).

Figure 3:
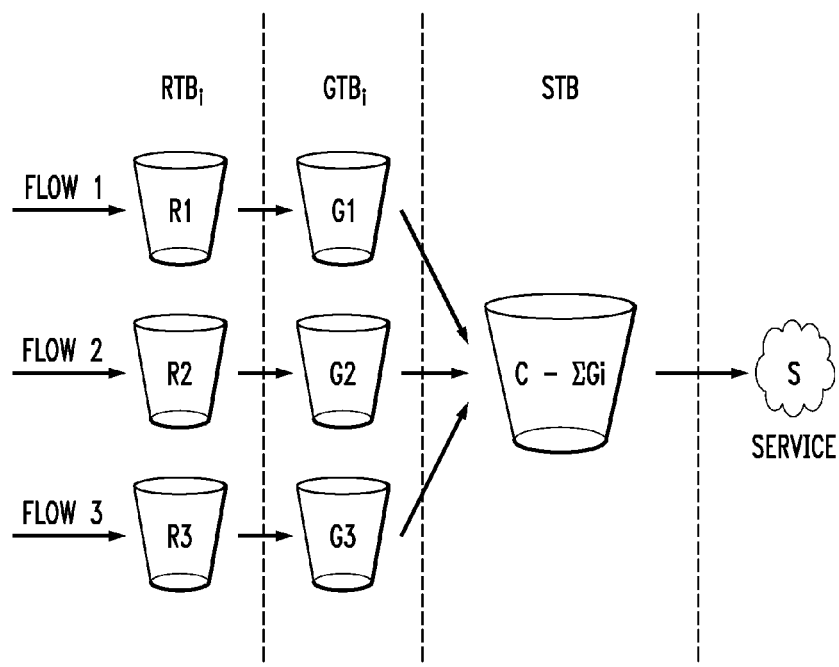
FIG. 3 is a schematic diagram illustrating the methodology of FIG. 2 according to an embodiment of the present invention.

Methodology 200 is further illustrated by way of reference to schematic diagram 300 presented in FIG. 3. As shown in FIG. 3, in this example there are three flows "flow 1," "flow 2" and "flow 3." Each of "flow 1," "flow 2" and "flow 3," has a restriction token bucket (RTB), with a refill rate "R1," "R2" and "R3," and a guarantee token bucket (GTB), with a refill rate "G1," "G2" and "G3," respectively. As described in conjunction with the description of methodology 200, above, each flow can also access a shared token bucket (STB) with a refill rate $C-\Sigma G_i$. See FIG. 3. The restriction token bucket (RTB) imposes an upper bound on the rate. Guarantee is ensured by a combination of a flow-private guarantee token bucket (GTB) and the shared token bucket. Tokens spill from the guarantee token bucket to the shared token bucket.

Thus, as shown in FIG. 3 and described above, in the basic scheme of the present techniques, a message requires n tokens from its restriction token bucket and n tokens from its guaranteed token bucket or from the shared token bucket in order to be transmitted to its destination (service) (i.e., see above, where deficit of tokens needed from the guarantee token bucket can come from the shared token bucket, if available). Otherwise the message is delayed (or discarded).

In addition to the basic scheme presented above, according to the present techniques, methodology 200 may be extended with (1) the ability to utilize unneeded tokens of other flows (referred to herein as token reassignment) and/or (2) the ability to take into account message urgency. These features are now described.

Token Reassignment: The maximal throughput is achieved when all the tokens, located in the guarantee token buckets and the shared token bucket, are utilized. However, one flow may have many spare tokens in its guarantee token bucket (GTB) while another flow has none and none are available in the shared token bucket (STB). In such cases, it is desirable to allow the flow with no tokens to use tokens (i.e., from the guarantee token bucket) of the flow that has many to spare, but does not need them. This action is referred to herein as token reassignment.

Figure 4:
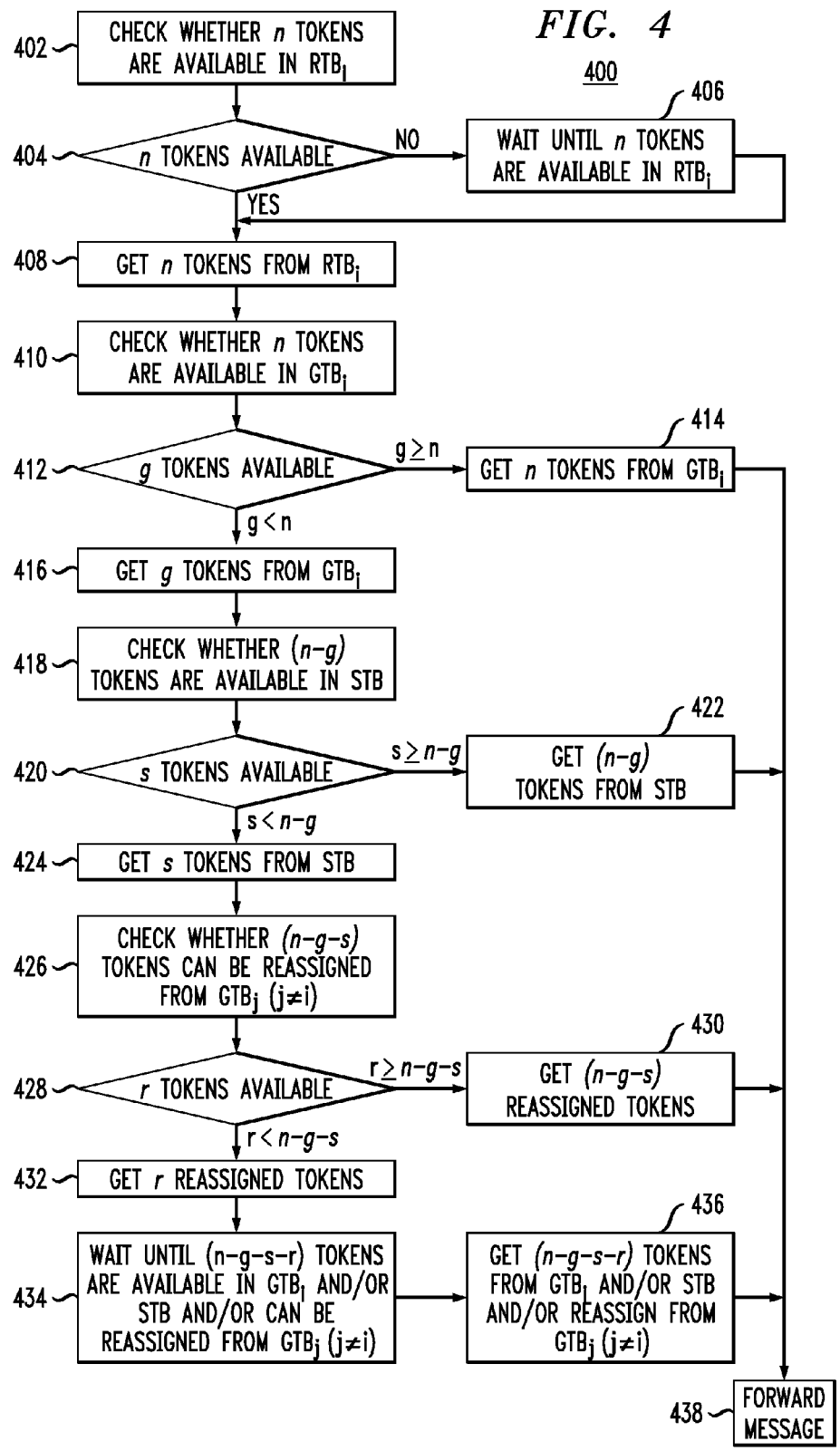
FIG. 4 is a diagram illustrating an exemplary methodology for controlling a flow rate of multiple data flows that employs token reassignment according to an embodiment of the present invention.

The addition of token reassignment to the basic process flow is shown illustrated in FIG. 4. As will be described in detail below, tokens may be reassigned from one flow to any other flow that needs them, when it needs them. This exemplary situation is illustrated in FIG. 4.

Methodology 400 proceeds in basically the same manner as methodology 200 (of FIG. 2) described above. Namely, when a message belonging to a particular flow (in this case message m belonging to flow i) arrives into the throttling node, in step 402, the restriction token bucket is checked to see whether the restriction token bucket of that flow (i.e., $RTB_i$ of flow i) has n tokens (available) (e.g., n tokens for a message of n bytes). A determination is then made in step 404 as to whether the restriction token bucket has n tokens available. If n tokens are not available (e.g., n tokens for a message of n bytes) are in the restriction token bucket, then in step 406, the message is delayed until enough tokens (e.g., n tokens for a message of n bytes) are available in the restriction token bucket (i.e., $RTB_i$) or, if applicable, the message is discarded, see above. If the message is not to be discarded, once the required number (i.e., n number) of tokens is available, the process continues at step 408 (described below).

When n tokens are available in the restriction token bucket, then in step 408 n tokens are taken from the restriction token bucket. The system then attempts to obtain n tokens from the guarantee token bucket (i.e., $GTB_i$ of flow i). Namely, in step 410, the guarantee token bucket is checked to see whether the guarantee token bucket of that flow (i.e., $GTB_i$ of flow i) has n tokens (available). As above, g is being used herein to designate the number of tokens available in the guarantee token bucket. A determination in then made in step 412 as to whether the number of tokens in the guarantee bucket g is greater than or equal to the n number of tokens needed (i.e., $g \geq n$) or the number of tokens in the guarantee bucket g is less than the n number of tokens needed (i.e., $g<n$). If $g \geq n$, then in step 414, n tokens are taken from the guarantee token bucket, and in step 438 the message is forwarded.

On the other hand, if $g<n$, then in step 416, g tokens are taken from the guarantee token bucket. The system then tries to obtain the deficit (i.e., n−g tokens) from the shared token bucket. Namely, in step 418, the shared token bucket (STB) is checked to see whether the shared token bucket has n−g tokens available. As above, s will be used to designate the number of tokens. A determination is then made in step 420 as to whether the number of tokens in the shared bucket s is greater than or equal to the n−g number of tokens needed (i.e., $s \geq n-g$) or the number of tokens in the shared bucket s is less than the n−g number of tokens needed (i.e., $s<n-g$). If $s \geq n-g$, then in step 422, n−g tokens are taken from the shared token bucket, and in step 438 the message is forwarded. On the other hand, if s<n−g, then in step 424, s tokens are taken from the shared token bucket.

Instead of delaying (or potentially discarding) the message at this point (as per methodology 200, described above), here an attempt is made to acquire (reassign) the deficit tokens from the guarantee token bucket of another flow (arbitrarily designated here as flow j, i.e., $GTB_j$ of flow j. Accordingly, in step 426, the guarantee token bucket of one or more other flows j is checked to see if there are n−g−s number of tokens available which can be reassigned. A monitoring process may be implemented that determines the amount of reassignable tokens for each $GTB_x$. By way of example only, the monitoring process can involve observing the number of remaining tokens whenever tokens are taken from a token bucket. See also the description of FIG. 5, below. The number of tokens available in the guarantee token buckets of the other flow(s) j will be referred to hereinafter as r number of tokens. A determination is then made in step 428 as to whether the number of tokens that can be reassigned r is greater than or equal to the n−g−s number of tokens needed (i.e., r≥n−g−s) or the number of tokens in the shared bucket s is less than the n−g−s number of tokens needed (i.e., r<n−g−s). If r≥n−g−s, then in step 430, n−g−s reassigned tokens are taken, and in step 438 the message is forwarded. On the other hand, if r<n−g−s, then in step 432, r reassigned tokens are taken.

In step 434, the message is delayed until the deficit number of tokens (i.e., n−g−s−r) is available in either a) the flow-private guarantee bucket of the present flow (i.e., $GTB_i$ of flow i), b) the shared token bucket (STB), can be reassigned (i.e., from the guarantee token bucket of other flow j, i.e., $GTB_j$ of flow j, where j≠i, or a combination of any of a-c (i.e., the remaining tokens needed can come from the guarantee token bucket $GTB_i$, the shared token bucket $STB_i$, the shared token bucket of another flow $GTB_j$ or any combination thereof to obtain the correct number of remaining tokens). The refill rates for the token buckets are shown in FIG. 1, described above. Once the remaining number of tokens (n−g−s) is available in the guarantee token bucket $GTB_i$ and/or the shared token bucket $STB_i$ and/or the guarantee token bucket of another flow $GTB_j$, then in step 436, n−g−s−r tokens are taken from the guarantee token bucket $GTB_i$ and/or the shared token bucket $STB_i$ and/or the guarantee token bucket of another flow $GTB_j$, and in step 438 the message is forwarded. In scenarios in which it is acceptable to discard messages, a message can at this stage be discarded instead of being delayed at step 434.

Figure 5:
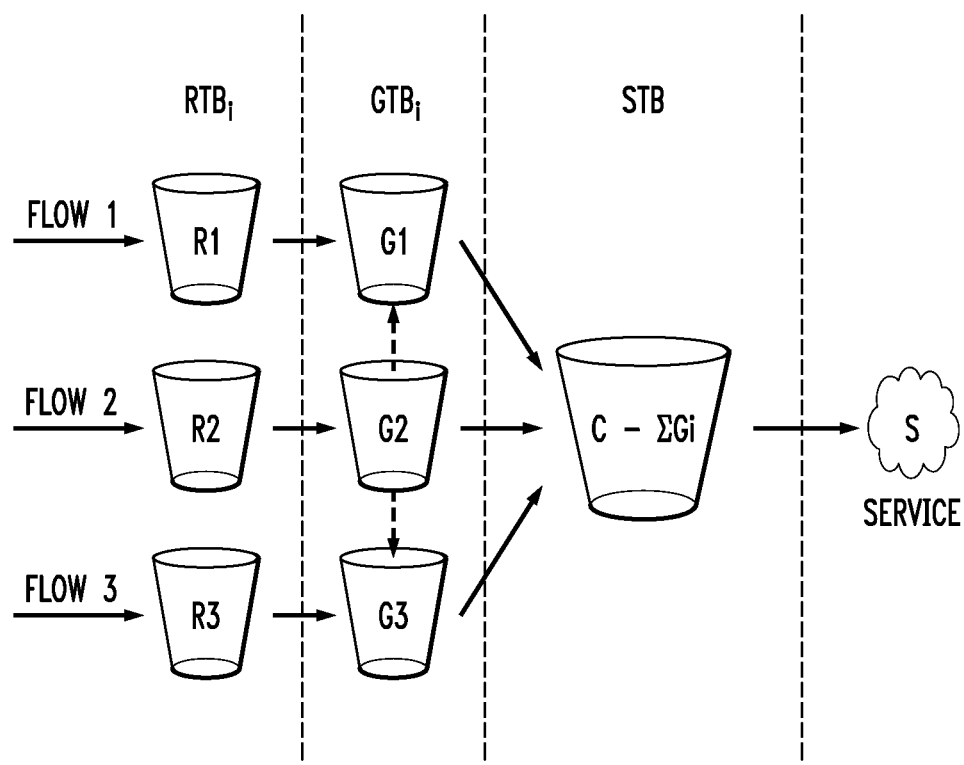
FIG. 5 is a schematic diagram illustrating the methodology of FIG. 4 according to an embodiment of the present invention.

Methodology 400 is further illustrated by way of reference to schematic diagram 500 presented in FIG. 5. The same three flows, and respective restriction token buckets and guarantee token buckets as shown in FIG. 3 are being used in FIG. 5. As highlighted above, a message requires one token from its restriction token bucket and one token from its guaranteed token bucket (or from the shared token bucket), otherwise the message is delayed (or discarded). Thus, as shown in FIG. 5, when for example, a message in flow 2 arrives into the throttling node, n tokens are taken from both the respective restriction token bucket (RTB) and guarantee token bucket (GTB) for flow 2. If, however, the guarantee token bucket (GTB) flow 2 does not have n tokens available, then according to this exemplary embodiment, tokens may be reassigned from the guarantee token bucket (GTB) of flow 1 or the guarantee token bucket (GTB) of flow 3 (flow 1 and flow 3 in this example are considered "source flows" if tokens are reassigned from them to the guarantee token bucket for flow 2). If none of the guarantee token buckets have any tokens, then tokens are taken from the shared token bucket (STB), if available.

According to an exemplary embodiment, in order to minimize the effect of token reassignment on the source flow (i.e., flow 1 or flow 3 in the example shown in FIG. 5), token utilization for each guarantee token bucket (GTB) can be monitored. Specifically, as described above, a monitoring process may be implemented that determines the amount of reassignable tokens for each $GTB_x$. By way of example only, the monitoring process can involve observing the number of remaining tokens whenever tokens are taken from a token bucket. More specifically, one can monitor the minimal number of tokens L that a guarantee token bucket (GTB) contains over a configurable period of time T.

Assume the number of tokens in $GTB_i$ does not fall below $L_i$ for T time units. In this case, at most a limit of $\beta L_i$ tokens (0≤β≤1) are allowed to be reassigned to any other flow that needs them, when it needs them. The value of token reassignment parameter β is configurable. When β=0, token reassignment is disabled. The greater β is, the greater impact on the source flow may be if the source flow suddenly requires the reassigned tokens due to a burst of its own messages. The designation of β parameter is application specific and one of ordinary skill in the art, given the present teachings would be able to determine an appropriate token reassignment parameter β for a given situation. It is notable however that a greater value of β may result in greater rate inaccuracies for the source flows. Accordingly, a limit may be set on the number of tokens which can be reassigned such that a minimum number of tokens is maintained in the guarantee token bucket for each of the data flows.

As highlighted above, the present techniques may be further configured to take into account the urgency of a message. This aspect is now described.

Support for Real-time Requirements: Messages forwarded by the proposed rate control techniques may have real-time requirements, i.e., there may be a deadline for message arrival to the destination (the service). It is highly undesirable to delay or discard a message whose deadline will soon expire, henceforth an urgent message. The urgency of a message may be represented by an urgency score. Namely, the urgency score determines message urgency compared to other messages (and their score). The message urgency score can be explicitly assigned to it by any agent on its way from source to destination. For example, the source can assign a score which may be later updated by intermediate nodes. Alternatively, urgency scores may also be derived from the proximity of its arrival deadline. Consequently, the present rate control scheme handles urgent messages differently: it tries to forward the urgent messages despite rate control considerations while minimizing the impact of such deviation from the base scheme.

According to an exemplary embodiment, urgent messages can be accommodated by the present rate control scheme in two ways. First, overdraft capabilities can be given to one or more of the token buckets, such that it remains possible to get tokens from an empty token bucket when an urgent message is involved. For instance, in one exemplary embodiment, the restriction token bucket (RTB) of each flow is augmented with overdraft capability, i.e., it is possible to get tokens from an empty token bucket. Subsequent refills, see below, will reduce and eliminate the overdraft. The overdraft parameter δ (0≤δ≤1) determines the maximal overdraft. Let $D_i$ be the depth of $RTB_i$. The maximal overdraft is $\delta D_i$. Tokens may be overdrawn from all types of token buckets. Namely, the guarantee token bucket (GTB) of each flow and the shared token bucket (STB), in this example, are similarly augmented with overdraft capability.

Further, separate overdraft limits for bucket types may be used. For example, the overdraft limit of a particular token bucket may be application specific. For example, if in a particular flow it is important that urgent messages arrive on time, a greater overdraft may be assigned. It is noted that the price that the application pays for overdraft is a greater burst size for that flow which should be taken into account when setting the overdraft limit.

The overdraft scheme is implemented within the context of the basic methodology 200 (of FIG. 2), thus as described above, a message requires one token from its restriction token bucket and one token from its guaranteed token bucket or from the shared token bucket in order to be transmitted to its destination (service). Therefore, with an urgent message, the overdraft scheme may be used to 1) obtain a token from the restriction token bucket (RTB) for that flow, 2) the guarantee token bucket (GTB) for that flow and/or 3) the shared token bucket (STB). However, if no tokens are available, the tokens are first overdrawn from the guarantee token bucket (GTB) and then from shared token bucket (STB) only if an overdraft from the GTB is not possible.

Further, when tokens cannot be overdrawn from the guarantee token bucket (GTB), an urgent message may obtain a token through token reassignment. Token reassignment was described above. The value of a token reassignment parameter may be different from β (i.e., β was described above in the context of token reassignment in an instance not involving an urgent message). A value greater than β allows borrowing more tokens, which gives greater priority to urgent messages.

Figure 6:
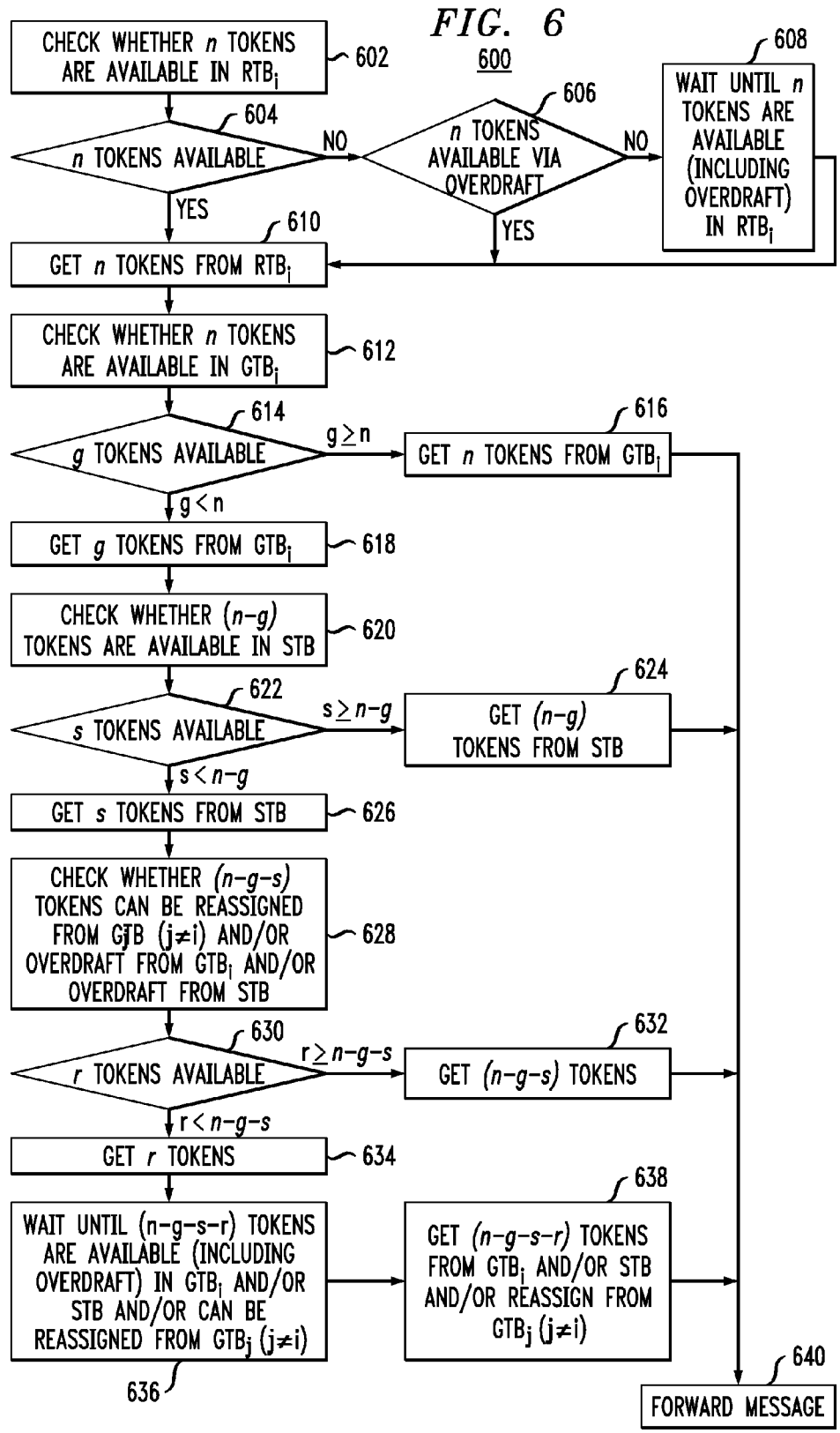
FIG. 6 is a diagram illustrating an exemplary methodology for controlling a flow rate of multiple data flows when an urgent message is received according to an embodiment of the present invention.

The addition of support for real-time requirements (such as urgent messages) to the basic process flow is shown illustrated in FIG. 6. As described above, when an urgent message needs to be transmitted, overdraft and token reassignment techniques can be implemented. This exemplary situation is illustrated in FIG. 6.

Methodology 600 proceeds in basically the same manner as methodology 400 (of FIG. 4 described above. Namely, when an urgent message belonging to a particular flow (in this case urgent message m belonging to flow i) arrives into the throttling node, in step 602, the restriction token bucket is checked to see whether the restriction token bucket of that flow (i.e., $RTB_i$ of flow i) has n tokens (available) (e.g., n tokens for a message of n bytes). A determination is then made in step 604 as to whether the restriction token bucket has n tokens available. If n tokens are not available (e.g., n tokens for a message of n bytes) are in the restriction token bucket, then in step 606, a determination is made as to whether n tokens are available in the restriction token bucket via overdraft.

A restriction token bucket of each flow is augmented with overdraft capability, i.e., it is possible to get tokens from an empty token bucket (the subsequent refills reduce and eliminate the overdraft). The overdraft parameter δ (0≤δ≤1) determines the maximal overdraft. Let $D_i$ be the depth of $RTB_i$. The maximal overdraft is $δD_i$. Similarly, guarantee token bucket of each flow and shared token bucket are augmented with overdraft capability. If no tokens are available, the tokens are first overdrawn from guarantee token bucket and then from shared token bucket. Increasing overdraft limit means more urgent messages can pass through without delay. However, greater overdraft limit increases the burst size which may result in exceeding the capacity of the service and thus prevent other legitimate messages from being serviced in a timely fashion.

If n tokens cannot be taken from the restriction token bucket via overdraft, then in step 608, the message is delayed until enough tokens (e.g., n tokens for a message of n bytes) are available in the restriction token bucket (i.e., $RTB_i$) including overdraft or, if applicable, the message is discarded, see above. If the message is not to be discarded, once the required number (i.e., n number) of tokens is available, the process continues at step 610 (described below).

On the other hand, if n tokens are available in the restriction token bucket or can be taken from the restriction token bucket via overdraft, then the process continues at step 610. Namely, if (or when) n tokens are available in the restriction token bucket, then in step 610 n tokens are taken from the restriction token bucket. The system then attempts to obtain n tokens from the guarantee token bucket (i.e., $GTB_i$ of flow i). Namely, in step 612, the guarantee token bucket is checked to see whether the guarantee token bucket of that flow (i.e., $GTB_i$ of flow i) has n tokens (available). As above, g is being used herein to designate the number of tokens available in the guarantee token bucket. A determination in then made in step 614 as to whether the number of tokens in the guarantee bucket g is greater than or equal to the n number of tokens needed (i.e., g≥n) or the number of tokens in the guarantee bucket g is less than the n number of tokens needed (i.e., g<n). If g≥n, then in step 616, n tokens are taken from the guarantee token bucket, and in step 640 the message is forwarded.

On the other hand, if g<n, then in step 618, g tokens are taken from the guarantee token bucket. The system then tries to obtain the deficit (i.e., n−g tokens) from the shared token bucket. Namely, in step 620, the shared token bucket (STB) is checked to see whether the shared token bucket has n−g tokens available. As above, s will be used to designate the number of tokens. A determination is then made in step 622 as to whether the number of tokens in the shared bucket s is greater than or equal to the n−g number of tokens needed (i.e., s≥n−g) or the number of tokens in the shared bucket s is less than the n−g number of tokens needed (i.e., s<n−g). If s≥n−g, then in step 624, n−g tokens are taken from the shared token bucket, and in step 640 the message is forwarded. On the other hand, if s<n−g, then in step 626, s tokens are taken from the shared token bucket.

Instead of delaying (or potentially discarding) the message at this point (as per methodology 200, described above), here an attempt is made to acquire (reassign) the deficit tokens from the guarantee token bucket of another flow (arbitrarily designated here as flow j, i.e., $GTB_j$ of flow j) and/or obtain the deficit tokens via overdraft from the guarantee token bucket of flow i, i.e., $GTB_i$, and/or obtain the deficit tokens via overdraft from the shared token bucket, i.e., STB. Accordingly, in step 628, the guarantee token bucket of one or more other flows j is checked to see if there are n−g−s number of tokens available which can be reassigned and/or it is determined whether overdraft of n−g−s is possible from $GTB_i$ and/or from STB. As described above, a monitoring process may be implemented that determines the amount of reassignable tokens for each $GTB_x$. The number of tokens available in the guarantee token buckets of the other flow(s) j and/or available via overdraft from $GTB_i$ and/or from STB will be referred to hereinafter as r number of tokens. A determination is then made in step 630 as to whether the number of tokens that can be reassigned and/or acquired via overdraft r is greater than or equal to the n−g−s number of tokens needed (i.e., r≥n−g−s) or the number of tokens that can be reassigned and/or acquired via overdraft r is less than the n−g−s number of tokens needed (i.e., r<n−g−s). If r≥n−g−s, then in step 632, n−g−s tokens reassigned and/or acquired via overdraft are taken, and in step 640 the message is forwarded. On the other hand, if r<n−g−s, then in step 634, r tokens reassigned and/or acquired via overdraft are taken.

In step 636, the message is delayed until the deficit number of tokens (i.e., n−g−s−r) is available in either a) the flow-private guarantee bucket of the present flow (i.e., $GTB_i$ of flow i) including overdraft, b) the shared token bucket (STB), c) can be reassigned (e.g., from the guarantee token bucket of other flow j, i.e., $GTB_j$ of flow j, where j≠i, or a combination of any of a–c (i.e., the remaining tokens needed can come from the guarantee token bucket $GTB_i$ including overdraft, the shared token bucket $STB_i$, the shared token bucket of another flow $GTB_j$ or any combination thereof to obtain the correct number of remaining tokens). The refill rates for the token buckets are shown in FIG. 1, described above. Once the remaining number of tokens (n−g−s) is available in the guarantee token bucket $GTB_i$ including via overdraft and/or the shared token bucket $STB_i$ and/or the guarantee token bucket of another flow $GTB_j$, then in step 638, n−g−s−r tokens are taken from the guarantee token bucket $GTB_i$ (potentially via overdraft) and/or the shared token bucket $STB_i$ and/or the guarantee token bucket of another flow $GTB_j$, and in step 640 the message is forwarded. In scenarios in which it is acceptable to discard messages, a message can at this stage be discarded instead of being delayed at step 636.

Figure 7:
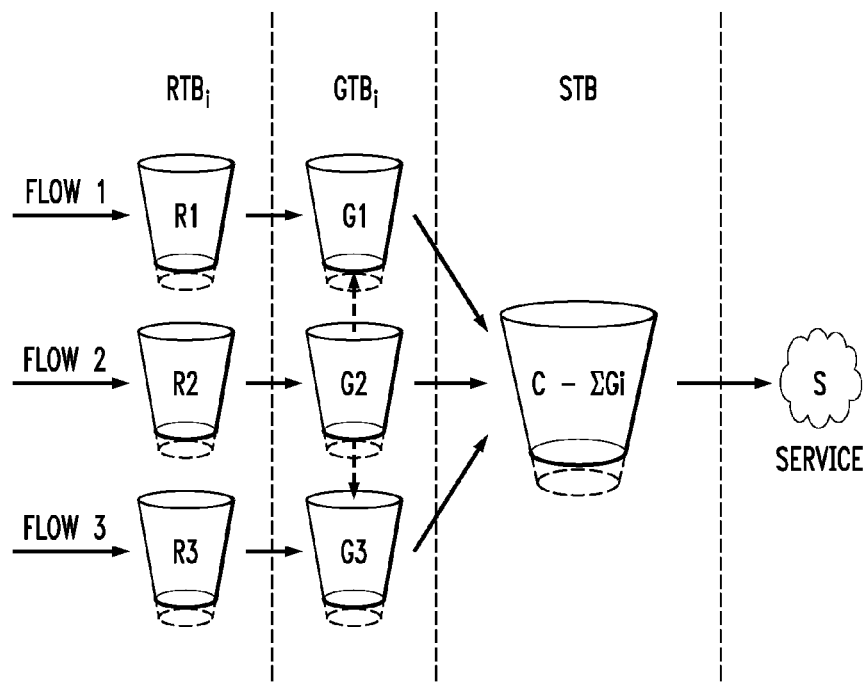
FIG. 7 is a schematic diagram illustrating the methodology of FIG. 6 according to an embodiment of the present invention.

Methodology 600 is further illustrated by way of reference to schematic diagram 700 presented in FIG. 7. The same three flows, and respective restriction token buckets and guarantee token buckets as shown in FIGS. 3 and 5 are being used in FIG. 7. As highlighted above, a message requires n tokens from its restriction token bucket and n tokens from its guaranteed token bucket (or from the shared token bucket), otherwise the message is delayed (or discarded). Thus, as shown in FIG. 7, when for example, an urgent message in flow 2 arrives into the throttling node, n tokens are taken from both the respective restriction token bucket (RTB) and guarantee token bucket (GTB) for flow 2. If, as described above, the restriction token bucket (RTB) does not have n tokens available, the overdraft provision (illustrated by the expanded bottoms on each of the token buckets) can be used to obtain the necessary tokens from the restriction token bucket (RTB). If the guarantee token bucket (GTB) does not have n tokens available, the overdraft provision (illustrated by the expanded bottoms on each of the token buckets) can be used to obtain the necessary tokens from the guarantee token bucket (RTB). As shown in FIG. 7, token reassignment can also be used, if necessary, to reassign tokens from one flow to another when needed. Alternatively, if neither overdraft nor token reassignment results in the necessary tokens from the guarantee token bucket (GTB), the tokens may be obtained from the shared token bucket (STB) which also has an overdraft provision (see FIG. 7).

Figure 8:
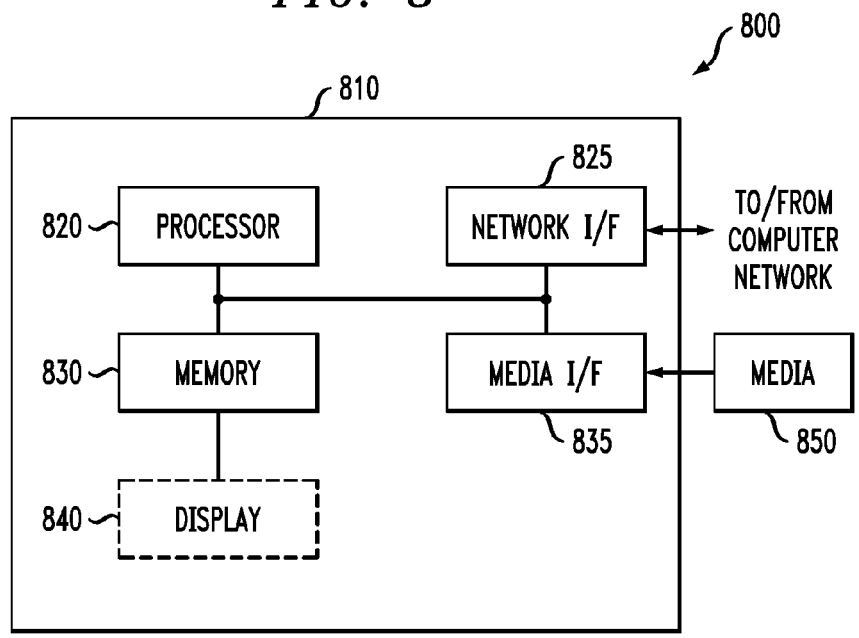
FIG. 8 is a diagram illustrating an exemplary apparatus for performing one or more of the methodologies presented herein according to an embodiment of the present invention.

Turning now to FIG. 8, a block diagram is shown of an apparatus 800 for implementing one or more of the methodologies presented herein. By way of example only, apparatus 800 can be configured to implement one or more of the steps of methodology 200 of FIG. 2, one or more of the steps of methodology 400 of FIG. 4 and/or one or more of the steps of methodology 600 of FIG. 6 for controlling a flow rate of multiple data flows.

Apparatus 800 comprises a computer system 810 and removable media 850. Computer system 810 comprises a processor device 820, a network interface 825, a memory 830, a media interface 835 and an optional display 840. Network interface 825 allows computer system 810 to connect to a network, while media interface 835 allows computer system 810 to interact with media, such as a hard drive or removable media 850.

As is known in the art, the methods and apparatus discussed herein may be distributed as an article of manufacture that itself comprises a machine-readable medium containing one or more programs which when executed implement embodiments of the present invention. For instance, when apparatus 800 is configured to implement one or more of the steps of methodology 200 the machine-readable medium may contain a program configured to provide i) a private restriction token bucket for each of the data flows, ii) a private guarantee token bucket for each of the data flows and iii) a shared token bucket common to all of the data flows, wherein the restriction token bucket for a given one of the data flows, data flow i, has a refill rate $R_i$ which is equal to a maximum flow rate for the data flow i and the guarantee token bucket for the data flow i has a refill rate $G_i$ which is equal to a minimum flow rate for the data flow i; obtain n number of tokens from the restriction token bucket for the data flow i when a message belonging to the data flow i arrives at the node and needs the n number of tokens to pass through the node; attempt to obtain the n number of tokens from one or more of the guarantee token bucket for the data flow i and the shared token bucket; and transmit the message if the n number of tokens are obtained from one or more of the guarantee token bucket for the data flow i and from the shared token bucket, otherwise delaying transmission of the message until the n number of tokens is available in one or more of the guarantee token bucket for the data flow i and in the shared token bucket.

The machine-readable medium may be a recordable medium (e.g., floppy disks, hard drive, optical disks such as removable media 850, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used.

Processor device 820 can be configured to implement the methods, steps, and functions disclosed herein. The memory 830 could be distributed or local and the processor device 820 could be distributed or singular. The memory 830 could be implemented as an electrical, magnetic or optical memory, or any combination of these or other types of storage devices. Moreover, the term "memory" should be construed broadly enough to encompass any information able to be read from, or written to, an address in the addressable space accessed by processor device 820. With this definition, information on a network, accessible through network interface 825, is still within memory 830 because the processor device 820 can retrieve the information from the network. It should be noted that each distributed processor that makes up processor device 820 generally contains its own addressable memory space. It should also be noted that some or all of computer system 810 can be incorporated into an application-specific or general-use integrated circuit.

Optional video display 840 is any type of video display suitable for interacting with a human user of apparatus 800. Generally, video display 840 is a computer monitor or other similar video display.

Although illustrative embodiments of the present invention have been described herein, it is to be understood that the invention is not limited to those precise embodiments, and that various other changes and modifications may be made by one skilled in the art without departing from the scope of the invention.

What is claimed is:

1. A method for controlling a flow rate of multiple data flows at a network node on a path of the data flows, the method comprising the steps of:
    providing i) a private restriction token bucket for each of the data flows, ii) a private guarantee token bucket for each of the data flows and iii) a shared token bucket common to all of the data flows, wherein the restriction token bucket for a given one of the data flows, data flow i, has a refill rate $R_i$, which is equal to a maximum flow rate for the data flow i and the guarantee token bucket for the data flow i has a refill rate $G_i$, which is equal to a minimum flow rate for the data flow i;
    obtaining n number of tokens from the restriction token bucket for the data flow i when a message belonging to the data flow i arrives at the node and needs the n number of tokens to pass through the node;
    attempting to obtain the n number of tokens from one or more of A) the guarantee token bucket for the data flow i and B) the shared token bucket; and
    transmitting the message if the n number of tokens are obtained from one or more of A) the guarantee token bucket for the data flow i and B) the shared token bucket, otherwise delaying transmission of the message until the n number of tokens are available in one or more of A) the guarantee token bucket for the data flow i and B) the shared token bucket.

2. The method of claim 1, further comprising the step of:
    waiting until the restriction token bucket for the data flow i contains the n number of tokens before performing the obtaining step.

3. The method of claim 1, wherein g number of tokens are available in the guarantee token bucket for the data flow i, and wherein g <n, the method further comprising the steps of:
    taking the g number of tokens from the guarantee token bucket for the data flow i; and
    taking n−g number of tokens from the shared token bucket.

4. The method of claim 3, wherein s number of tokens are available in the shared token bucket, and wherein s<n−g, the method further comprising the steps of:
    taking the s number of tokens from the shared token bucket; and
    waiting until n−g−s number of tokens are available in one or more of A) the guarantee token bucket for the data flow i and B) the shared token bucket.

5. The method of claim 1, wherein a destination of the data flows is a web-based service having a service capacity C equivalent to a maximal rate of incoming requests, and wherein the shared token bucket has a refill rate equal to $C-\Sigma G_i$ plus tokens, if any, spilled from the guarantee token bucket for the data flow i.

6. The method of claim 1, further comprising the step of:
    transmitting the message if n tokens are obtained from the guarantee token bucket for the data flow i or from the shared token bucket, otherwise discarding the message.

7. The method of claim 1, wherein the node is a throttling node.

8. The method of claim 1, further comprising the step of:
    reassigning tokens from the guarantee token bucket of one of the data flows to the guarantee token bucket of another of the data flows.

9. The method of claim 8, further comprising the step of:
    setting a limit on a number of tokens which can be reassigned such that a minimum number of tokens is maintained in the guarantee token bucket for each of the data flows.

10. The method of claim 8, wherein g number of tokens are available in the guarantee token bucket for the data flow i and g<n, wherein s number of tokens are available in the shared token bucket and s<n−g, and wherein r number of tokens can be reassigned from the guarantee token bucket of another data flow j to the guarantee token bucket for the data flow i and r ≥n−g−s, the method further comprising the steps of:
    taking the g number of tokens from the guarantee token bucket for the data flow i;
    taking n−g number of tokens from the shared token bucket.
    taking the s number of tokens from the shared token bucket; and
    taking n−g−s number of tokens of reassigned tokens.

11. The method of claim 1, wherein the message is urgent and wherein at least one of the restriction token bucket for the data flow i, the guarantee token bucket for the data flow i and the shared token bucket is empty, the method further comprising the step of:
    permitting overdrafting of tokens from the restriction token bucket for the data flow i, the guarantee token bucket for the data flow i and the shared token bucket.

12. The method of claim 11, wherein g number of tokens are available in the guarantee token bucket for the data flow i and g<n, wherein s number of tokens are available in the shared token bucket and s<n−g, and wherein r number of tokens can be obtained by overdraft via one or more of A) the guarantee token bucket for the data flow i and B) the shared token bucket, and r≥n−g−s, the method further comprising the steps of:
    taking the g number of tokens from the guarantee token bucket for the data flow i;
    taking n−g number of tokens from the shared token bucket;
    taking the s number of tokens from the shared token bucket; and
    taking n−g−s number of tokens of overdrafted tokens.

13. The method of claim 11, further comprising the step of:
    reassigning tokens from the guarantee token bucket of one of the data flows to the guarantee token bucket of another of the data flows.

14. The method of claim 13, further comprising the step of:
    setting a limit on a number of tokens which can be reassigned such that a minimum number of tokens is maintained in the guarantee token bucket for each of the data flows.

15. An apparatus for controlling a flow rate of multiple data flows at a network node on a path of the data flows, the apparatus comprising:
    a memory; and
    at least one processor device, coupled to the memory, operative to:
        provide i) a private restriction token bucket for each of the data flows, ii) a private guarantee token bucket for each of the data flows and iii) a shared token bucket common to all of the data flows, wherein the restriction token bucket for a given one of the data flows, data flow i, has a refill rate $R_i$, which is equal to a maximum flow rate for the data flow i and the guarantee token bucket for the data flow i has a refill rate $G_i$, which is equal to a minimum flow rate for the data flow i;
        obtain n number of tokens from the restriction token bucket for the data flow i when a message belonging to the data flow i arrives at the node and needs the n number of tokens to pass through the node;
        attempt to obtain the n number of tokens from one or more of A) the guarantee token bucket for the data flow i and B) the shared token bucket; and transmit the message if the n number of tokens are obtained from one or more of A) the guarantee token bucket for the data flow i and B) the shared token bucket, otherwise delaying transmission of the message until the n number of tokens are available in one or more of A) the guarantee token bucket for the data flow i and B) the shared token bucket.

16. The apparatus of claim 15, wherein a destination of the data flows is a web-based service having a service capacity C equivalent to a maximal rate of incoming requests, and wherein the shared token bucket has a refill rate equal to $C-\Sigma G_i$ plus tokens, if any, spilled from the guarantee token bucket for the data flow i.

17. The apparatus of claim 15, wherein the at least one processor device is further operative to:
reassign tokens from the guarantee token bucket of one of the data flows to the guarantee token bucket of another of the data flows.

18. The apparatus of claim 17, wherein the at least one processor device is further operative to:
set a limit on a number of tokens which can be reassigned such that a minimum number of tokens is maintained in the guarantee token bucket for each of the data flows.

19. The apparatus of claim 15, wherein the message is urgent and wherein at least one of the restriction token bucket for the data flow i, the guarantee token bucket for the data flow i and the shared token bucket is empty, wherein the at least one processor device is further operative to:
permit overdrafting from the restriction token bucket for the data flow i, the guarantee token bucket for the data flow i and the shared token bucket.

20. An article of manufacture for controlling a flow rate of multiple data flows at a network node on a path of the data flows, comprising a non-transitory machine-readable recordable medium containing one or more programs which when executed implement the steps of:
providing i) a private restriction token bucket for each of the data flows, ii) a private guarantee token bucket for each of the data flows and iii) a shared token bucket common to all of the data flows, wherein the restriction token bucket for a given one of the data flows, data flow i, has a refill rate $R_i$ which is equal to a maximum flow rate for the data flow i and the guarantee token bucket for the data flow i has a refill rate $G_i$ which is equal to a minimum flow rate for the data flow i;
obtaining n number of tokens from the restriction token bucket for the data flow i when a message belonging to the data flow i arrives at the node and needs the n number of tokens to pass through the node;
attempting to obtain the n number of tokens from one or more of A) the guarantee token bucket for the data flow i and B) the shared token bucket; and
transmitting the message if the n number of tokens are obtained from one or more of A) the guarantee token bucket for the data flow i and B) the shared token bucket, otherwise delaying transmission of the message until the n number of tokens are available in one or more of A) the guarantee token bucket for the data flow i and B) the shared token bucket.

21. The article of manufacture of claim 20, wherein a destination of the data flows is a web-based service having a service capacity C equivalent to a maximal rate of incoming requests, and wherein the shared token bucket has a refill rate equal to $C-\Sigma G_i$ plus tokens, if any, spilled from the guarantee token bucket for the data flow i.

22. The article of manufacture of claim 20, wherein the one or more programs which when executed further implement the step of:
reassigning tokens from the guarantee token bucket of one of the data flows to the guarantee token bucket of another of the data flows.

23. The article of manufacture of claim 22, wherein the one or more programs which when executed further implement the step of:
setting a limit on a number of tokens which can be reassigned such that a minimum number of tokens is maintained in the guarantee token bucket for each of the data flows.

24. The article of manufacture of claim 20, wherein the message is urgent and wherein at least one of the restriction token bucket for the data flow i, the guarantee token bucket for the data flow i and the shared token bucket is empty, wherein the one or more programs which when executed further implement the step of:
permitting overdrafting from the restriction token bucket for the data flow i, the guarantee token bucket for the data flow i and the shared token bucket.

* * * * *